(12) United States Patent
Wang

(10) Patent No.: US 9,773,050 B2
(45) Date of Patent: Sep. 26, 2017

(54) USER INTERFACE FOR AGGREGATED TASK DATA

(71) Applicant: salesforce.com, inc., San Francisco, CA (US)

(72) Inventor: Yuan Wang, Dublin, CA (US)

(73) Assignee: salesforce.com, inc., San Francisco, CA (US)

( * ) Notice: Subject to any disclaimer, the term of this patent is extended or adjusted under 35 U.S.C. 154(b) by 224 days.

(21) Appl. No.: 14/745,169

(22) Filed: Jun. 19, 2015

(65) Prior Publication Data
US 2016/0370955 A1  Dec. 22, 2016

(51) Int. Cl.
G06F 3/0482 (2013.01)
G06F 17/30 (2006.01)
G06Q 10/06 (2012.01)

(52) U.S. Cl.
CPC ....... G06F 17/30572 (2013.01); G06Q 10/06 (2013.01); G06Q 10/06311 (2013.01)

(58) Field of Classification Search
CPC . G06F 3/0482; G06F 17/30572; H04L 67/02; G06Q 10/06; G06Q 10/06311
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |

(Continued)

*Primary Examiner* — Anil Bhargava
(74) *Attorney, Agent, or Firm* — Lorenz & Kopf, LLP

(57) ABSTRACT

A method for aggregating and presenting task data includes retrieving, from a task database, a plurality of task objects, each including at least a task description and a task date. A subset of the task objects are aggregated to obtain aggregated task data. A visual representation of the aggregated task data is displayed on a computing device, the visual representation including a temporal distribution of the subset of task objects and, for each task date of the subset of the task objects, a visual cue indicating an intensity level of the task objects associated with each task date.

22 Claims, 4 Drawing Sheets

(56) References Cited

U.S. PATENT DOCUMENTS

| | | |
|---|---|---|
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2009/0288030 A1* | 11/2009 | Wahl .................. G06Q 10/06 715/772 |
| 2011/0218958 A1 | 9/2011 | Warshavsky et al. |
| 2011/0247051 A1 | 10/2011 | Bulumulla et al. |
| 2011/0288900 A1* | 11/2011 | McQueen ........ G06Q 10/06311 705/7.16 |
| 2012/0042218 A1 | 2/2012 | Cinarkaya et al. |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0223338 A1* | 8/2014 | Okocha ................ G06Q 10/10 715/762 |
| 2015/0193722 A1* | 7/2015 | Seaman ............... G06Q 10/109 705/7.15 |
| 2017/0083178 A1* | 3/2017 | Kirov ................. G06F 3/04883 |

\* cited by examiner

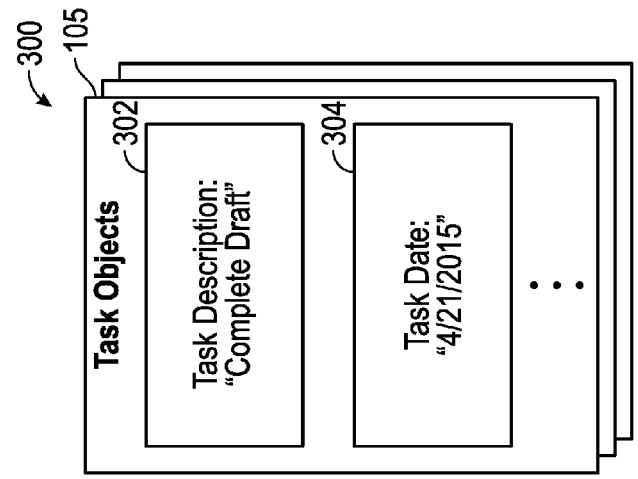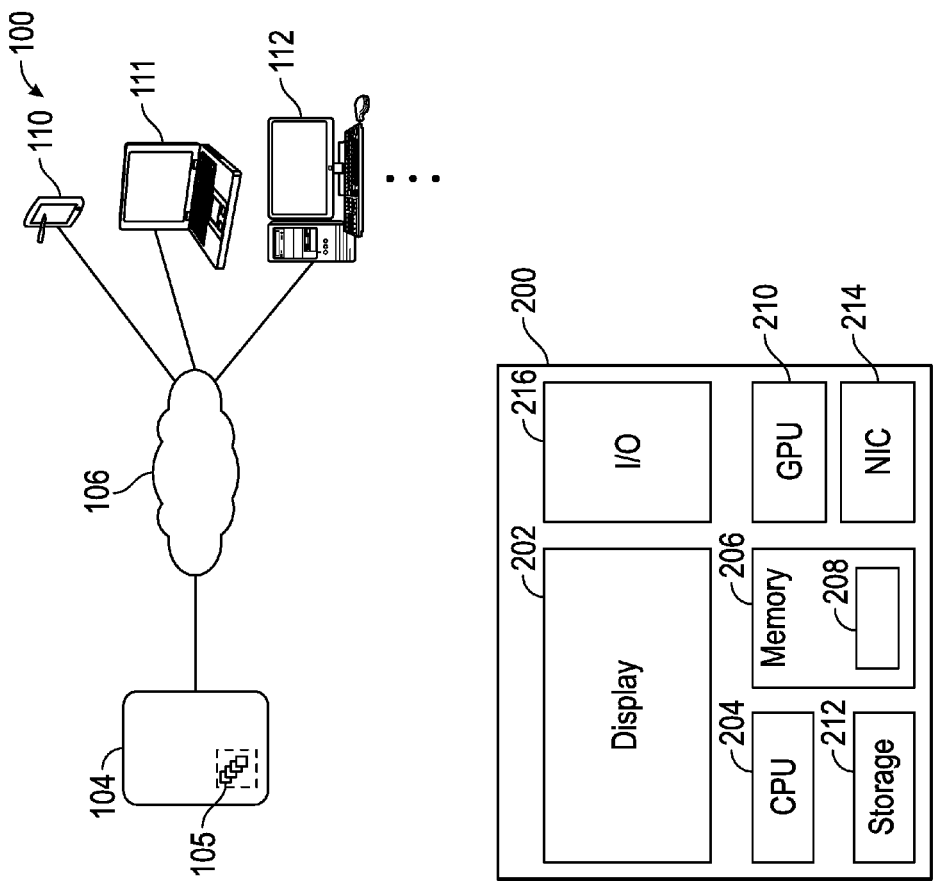

USER INTERFACE FOR AGGREGATED TASK DATA

TECHNICAL FIELD

Embodiments of the subject matter described herein relate generally to the presentation of task data, and more particularly, to user interface systems and methods for providing and interacting with such task data.

BACKGROUND

Modern computer-based calendaring systems provide an efficient and effective way for users to manage their time, allowing users to enter and modify tasks and view those tasks in a calendar format (e.g., week-based or month-based displays). One popular method of entering a new task involves the use of a "date picker" user interface. Such interfaces allow the user to display and select a date from a drop-down menu or other widget rather than enter a date manually.

Conventional date-picker user interfaces are unsatisfactory in a number of respects. For example, the calendar provided by the date-picker is typically just a view of an un-annotated calendar of the month (or week). Referring momentarily to the example prior art date-picker interface 400 shown in FIG. 4, it can be seen that the drop-down calendar display merely includes the days of the month (e.g., 404) arranged in the appropriate manner for that month. While, the user can then click on the desired task date, which will then be used to fill the date field, the user is unaware of how many other tasks are due on that particular day and/or how important each of those tasks are. As a result, the user may inadvertently over-schedule a particular day or otherwise fail to distribute his or her tasks satisfactorily.

Accordingly, methods and systems are desired for improved methods for entering, aggregating, and presenting task data.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 1 is conceptual block diagram depicting a system and computing devices in accordance with one embodiment;

FIG. 2 is a conceptual block diagram of an exemplary computing device;

FIG. 3 depicts aggregated task objections in accordance with one embodiment;

FIG. 4 depicts an exemplary prior art date-picker calendar user interface;

FIG. 5 depicts an exemplary date-picker in accordance with one embodiment;

FIG. 6 depicts an exemplary date-picker in accordance with another embodiment;

DETAILED DESCRIPTION

Figure 7:
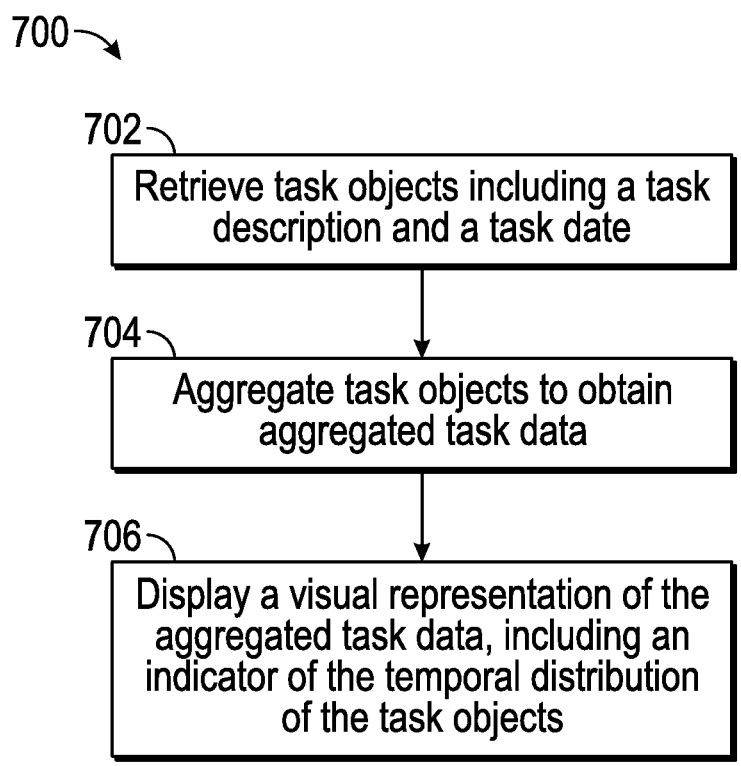
FIG. 7 is a flowchart illustrating a method in accordance with one embodiment.

Embodiments of the subject matter described herein generally relate to systems and methods for aggregating and presenting task data in way that allows a user to better manage his or her time by, for example, providing a visual representation of the likely "intensity level" of each calendar day—i.e., the number and priority level of tasks due on that day.

A method for aggregating and presenting task data in accordance with one embodiment includes retrieving, from a task database, a plurality of task objects, each including at least a task description and a task date. A subset of the task objects are aggregated to obtain aggregated task data. A visual representation of the aggregated task data is displayed on a computing device, the visual representation including a temporal distribution of the subset of task objects and, for each task date of the subset of the task objects, a visual cue indicating an intensity level of the task objects associated with each task date.

A task aggregation and presentation system in accordance with one embodiment includes a task database and a computing device coupled to the task database via a network. The task database comprises a plurality of task objects, each including at least a task description and a task date, the database configured to produce aggregated task data based on a subset of the plurality of task objects. The computing device is configured to request, over a network, the aggregated task data from the task database and to display a visual representation of the aggregated task data, the visual representation including a temporal distribution of the subset of task objects and, for each task date of the subset of the task objects, a visual cue indicating an intensity level of the task objects associated with each task date.

Referring now to the conceptual block diagram depicted in FIG. 1, task aggregation and presentation system (or simply "system") 100 in accordance with one embodiment generally includes a database 104 having one or more task objects 105 stored therein, and a plurality of computing devices (or simply "devices") 110, 111, 112, etc., communicatively coupled to database 104 via, for example, a data communication network 106 (e.g., the Internet).

Database (or "server") 104 may be implemented using any suitable combination of hardware and software and may correspond to any of a variety of database system types, including, for example, a multi-tenant system as described in further detail below in connection with FIG. 8. The range of embodiments are not so limited, however. Similarly, devices 110-112, etc. may include any combination of hardware and software configured to access database 104 via network 106 and to provide a user interface (via a suitable display and input/output components) that allows a user to interact with various applications executable by devices 110, 111, and 112.

Devices 110-112 may correspond, for example, to a desktop computer, a laptop computer, a tablet computer, a smart-phone, or the like. In that regard, One or more of devices 110-112 may be implemented as a computing device 300 as shown in FIG. 3, generally includes a display (e.g., a touch-screen display) 202, a central processing unit (CPU) 204, one or more memory components 206, a graphics programming unit (GPU) 210, a network interface component 214 (e.g., a WiFi, Ethernet, or other such interface), and one or more input/output interfaces 216. CPU 204 is configured to execute machine readable software code 208 (which might correspond to any and all of the various software components described herein) and, via GPU 210, render graphics on display 202. GPU 310 may include any of the various GPU components known in the art that are capable of interfacing with CPU 204 (via an appropriate GPU application programming interface, or "API") to render displayable components on to display 202.

In the context of a user interface employing a web browser, for example, Such displayable components might include, without limitation, various text components, image components (e.g., JPG, PNG, etc.), video components (e.g., AVI, animated-GIFs, etc.), interactive user interface components (e.g., buttons, text entry regions), and widgets (such as date-picker and calendar widgets). Such displayable components, as is known in the art, may be produced by a web browser configured to parse and render web resources such as hypertext transfer markup language (HTML) files, cascading style sheet (CSS) files, Javascript code, and other such files used to render websites. Suitable browsers include, for example, Microsoft Internet Explorer, Mozilla Firefox, Google Chrome, Apple Safari, Opera, or the like. Similarly, browser 230 may implement a variety of application programming interfaces (APIs) and include any suitable layout engine, such as the Webkit layout engine.

Task objects 105 generally include any combination of computer-stored information and attributes that may be used to characterize a "task" to be stored and tracked by a given user, for example, "pick up groceries," "pay electric bill," "meeting with Mark," etc. In that regard, FIG. 3 depicts a subset of task objects 105 that together compose "aggregated task data" 300. While each task object 105 may have any number of attributes, in the illustrated embodiment each task object 105 includes a task description 302, a task date 304, and a task priority 306.

The task description 302 will generally include an alphanumeric description of the task to be performed (e.g., "complete document,") but may be blank or include any arbitrary text. The task date 304 corresponds to the due date or other milestone related to task description 302. In the illustrated embodiment, the task date is "Apr. 21, 2015." Priority level 306 includes any suitable representation of the importance of that particular task—e.g., how important it is to complete the task on the stated task date 304. Priority level 306 may, for example, consist of discrete levels ("low", "medium", "hi"), or may have a numeric value within some predefined range (0, 1, . . . , 10). The priority levels 306 may be stored and represented in any convenient manner within database 104, as is known in the art.

It will be understood that a task object 105 may, depending upon the context, include any number of additional attributes not shown in FIG. 3, such as start time, end time, location, attendees (in the case of a scheduled meeting), reminder times, task category, etc. The task description 302, task date 304, priority 306, and other attributes will typically be entered manually by the user, but may in some cases be assigned automatically by computing device 110 or task database 104.

Figures 4, 5, 6:
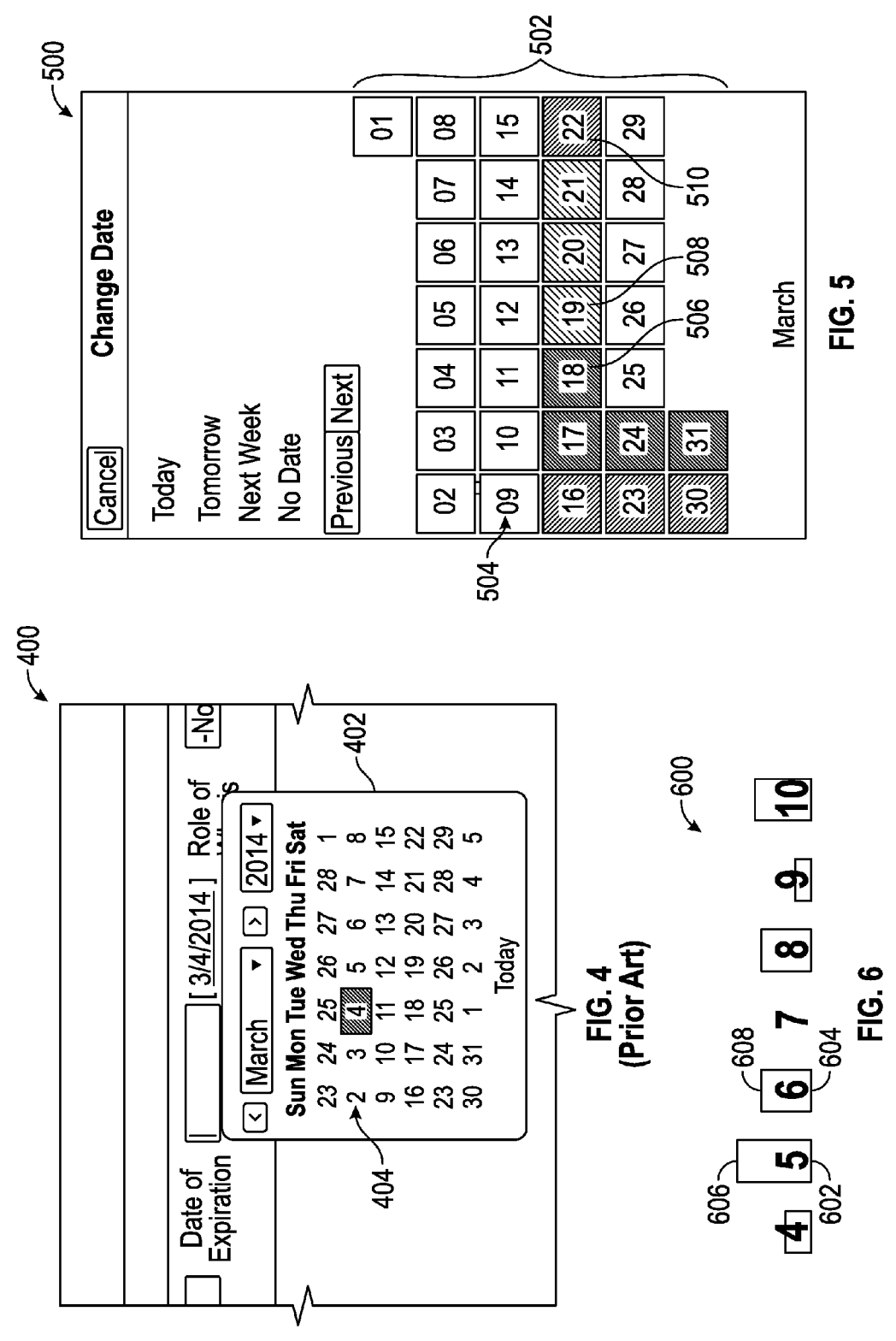

In some time-management systems the task date 304 may be entered by the user using a "date-picker" user interface. Referring now to FIG. 4, as mentioned above, a typical prior art date-picker interface 400 includes a drop-down calendar display 402 that includes the days of the month (e.g., 404) arranged in the appropriate manner for that month. While, the user can then click on the desired task date (e.g., Mar. 4, 2014), and that date will be used to fill the associated date field (in this case "Date of Expiration"), the user is unaware of how many other tasks are due on that particular day as well as whether any high priority tasks are due that day. As a result, the user may inadvertently over-schedule a particular day or otherwise fail to distribute his or her tasks satisfactorily. And while calendar applications often display small rectangular regions for each scheduled task for that day (so a user may see how many tasks are scheduled for that day), it is impossible to determine the priority level of those tasks.

In accordance with the present invention, however, the user interface includes a visual representation that provides a temporal distribution of the subset of task objects (e.g., in the form of a month-based or week-based calendar display) as well as a visual cue indicating an "intensity level" of the task objects associated with each task date. As described in further detail below, the "intensity level" generally corresponds to how "busy" the user is likely to be on that day, given the number of tasks due that day and the priority level (e.g., "low", "medium", "hi") of each of those tasks.

FIG. 5, for example, illustrates an example date-picker user interface 500 in which the visual cues include a plurality of colors associated with respective intensity levels (e.g., a "heat map"). More particularly, as shown in FIG. 5, the user is presented with a calendar graphic 502 include each of the days 504 of the month (1 through 31) arranged in a month-based configuration. For each day, however, the square region corresponding to each day includes a visual cue indicating the intensity level—in this case, various grades of grey, where darker greyscale levels indicate higher intensity, and lower greyscale levels indicate lower intensity. Thus, it can be seen that the 19th (508) is relatively light, the 22nd (510) is darker, and the 18th (506) is darker still. Thus, while picking a date, the user is presented with an intuitive overview of how busy he or she is likely to be as the week progresses, and can select a date with a view to more evenly distributing the required workload. It will be understood that while FIG. 5 illustrates shades of grey, other color scales (such as a rainbow-progression) may be used. Furthermore, the range of embodiments are not limited to the square color regions shown in FIG. 5. E.g., the numerals used to indicate the dates themselves may be rendered using a color that indicates the intensity level.

FIG. 6 illustrates another example, in which the visual cues are geometric shapes associated with respective intensity levels. That is, as shown in FIG. 6, a week-based date-picker view 600 includes the days of the week "4" through "10", along with a rectangular area whose height is based on the intensity level of that particular day. Thus, for example, rectangular region 606 corresponding to date 602 is higher than that of region 608, which corresponds to date 604. This would indicate to the user that the 5th is likely to be busier than the 6th during that week.

The range of visual cues that can be used to indicate the intensity of a given day are not limited by the examples shown in FIGS. 5 and 6, however. Other examples include circular regions whose radii are proportional to their respective intensities, date numerals whose sizes are related to their respective intensities, animated graphics for each day corresponding to their respective intensities, and so on.

The "intensity" value for any given date may be computed in a variety of ways. In one embodiment a weighting factor is assigned to each priority level, and a sum of the weighting factors for all the task objects are summed for each day, restrained to some selected ceiling value. For the purposes of example and without loss of generality, assume that the priority levels for a particular task system include the designations "low", "medium", and "high", and have corresponding weights "0.5", "1.0", and "3.0". If the user has two tasks on the 1st of the month, each with a "medium" priority level, then the sum for that day is 2×1.0=2.0. Similarly, if the user has one "high" priority tasks on the 2nd of the month, the intensity sum for that day is 1×3.0=3.0. Thus, in this example, the user is "busier" on the 2nd than the 1st of the month. The weighting values may be fixed or configurable by the user. Similarly, the number of priority levels may be fixed or configurable by the user.

Referring now to the exemplary flowchart 700 of FIG. 7 in conjunction with FIGS. 1-3, a summary of the an exemplary method for aggregating and presenting task data will now be described. For the purposes of illustration, it will be assumed that the user is employing device 110 to access task database 104.

First, at 702, the task objects 105 are retrieved from task database 104, and these tasks are then "aggregated" (at 704) based on any desired parameters. For example, a subset of task objects 105 may be retrieved based on a desired date range. This might occur, for example, when the user is employing computing device 110 to select a date for "March 2015," in which case only those task objects 105 with task dates 304 for that month need be retrieved and aggregated.

In a particular embodiment, this method is performed in conjunction with the visual representation of a date-picker user interface (e.g., FIG. 5 or 6) configured to allow a user to specify a task description 302, a task date 304, and a priority level 306, to be transmitted to the task database 104.

Aggregation of task objects 105 as shown in step 704 may be performed by computing device 110 (client-side), but may be more suitably performed by task database 104 (server-side).

Next, at 706, computing device 110 displays a visual representation of the aggregated task data (300) in such as way that it includes a temporal distribution and intensity level of the task objects. As described above, the temporal distribution may be a month-based view, a week-based view, or an arbitrary range of dates rendered in any desirable pattern—such as an entire month of dates arranged as a circle increasing in the clockwise direction. Similarly, the visual cues used to indicate intensity levels may correspond to any of the various ways described above.

The visual representation may be rendered onto the display 202 of computing device 110 in a variety of ways. In one embodiment, a date-picker user interface (e.g., as shown in FIG. 5) is produced by a web browser running on computing device 110. In such a case, suitable HTML, CSS, and Javascript code may be produced to request the aggregated task data 300 from task database 104 and then render the data-picker within the browser window.

In one embodiment, Javascript running within the browser of computing device 100 initiates a server side action (i.e., a request to task database 104 over network 106) to retrieve a map within the range of dates and the aggregated task data for those days. The following snippet of Javascript code, for example, invokes the "getHeatMap" action to produce this result.

```
var action = cmp.get('c.getHeatMap');
action.setCallback(this, function(action) {
    var json = hlp.convertJSON(action.returnValue),
    monthStart;
    cal.init({ //cal is the object pointing to the map UI.
        domain: "month",
        subDomain:"x_day",
        subDomainTextFormat:"%d",
        range: 1,
        cellSize: 56,
        cellPadding: 4,
        domainMargin: [0, 2, 0, 2],
        legend: [2,4,6,8,10],
        considerMissingDataAsZero: false,
        previousSelector: "#previous",
        nextSelector: "#next",
```

-continued

```
        onClick: function(date) {
            var d = new Date(date);
            hlp.notifyActivityDateChanged(cmp, hlp.dateAsString(d));
        }
    });
    //start and end being the first and last of the domain range
    monthStart = cal.getDomainKeys( )[0];
    cal.options.data = json;
    cal.update(json);
    cal.highlight(new Date);
};
action.setCallback(this, function(action) {
    var json = hlp.convertJSON(action.returnValue),
    monthStart;
    cal.init({ //cal is the object pointing to the map UI.
        domain: "month",
        subDomain:"x_day",
        subDomainTextFormat:"%d",
        range: 1,
        cellSize: 56,
        cellPadding: 4,
        domainMargin: [0, 2, 0, 2],
        legend: [2,4,6,8,10],
        considerMissingDataAsZero: false,
        previousSelector: "#previous",
        nextSelector: "#next",
        onClick: function(date) {
            var d = new Date(date);
            hlp.notifyActivityDateChanged(cmp, hlp.dateAsString(d));
        }
    });
    //start and end being the first and last of the domain range
    monthStart = cal.getDomainKeys( )[0];
    cal.options.data = json;
    cal.update(json);
    cal.highlight(new Date);
}
//start and end being the first and last of the domain range
monthStart = cal.getDomainKeys( )[0];
cal.options.data = json;
cal.update(json);
cal.highlight(new Date);
}
```

It will be appreciated that the task database 104 of FIG. 1 may be implemented in the context of a wide range of database architectures. In that regard, FIG. 8 depicts an exemplary multi-tenant system suitable for implementation of the systems and methods described herein. That is, the various devices 804 may correspond to devices 110, 111, and/or 112 of FIG. 1, while task objects 105 may be stored within multi-tenant database 830.

Figure 8:
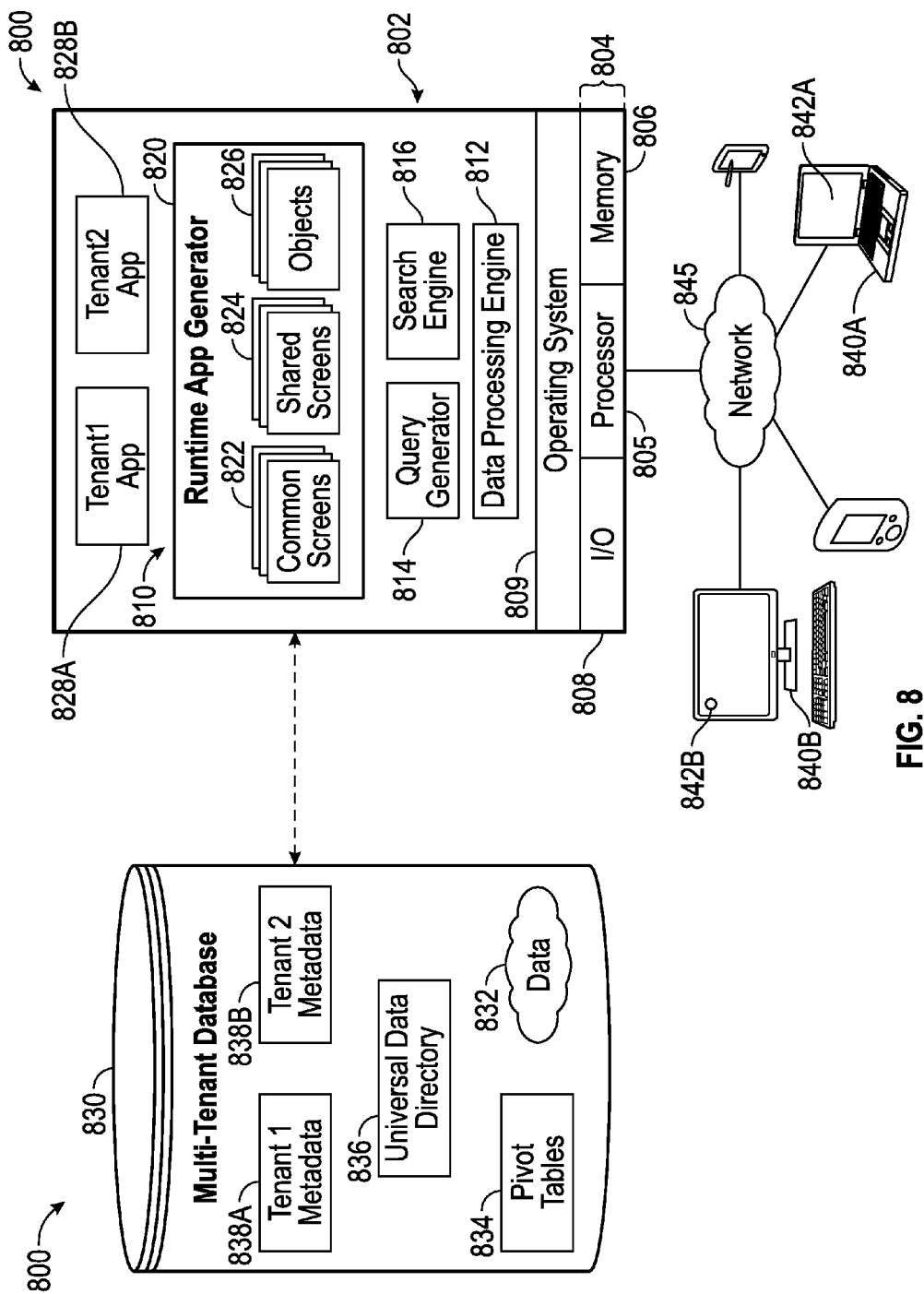
FIG. 8 is a conceptual block diagram of a multi-tenant system in accordance with one embodiment.

The multi-tenant system 800 of FIG. 8 includes a server 802 that dynamically creates and supports virtual applications 828 based upon data 832 from a common database 830 that is shared between multiple tenants, alternatively referred to herein as a multi-tenant database. Data and services generated by the virtual applications 828 are provided via a network 845 to any number of client devices 840, as desired. Each virtual application 828 is suitably generated at run-time (or on-demand) using a common application platform 810 that securely provides access to the data 832 in the database 830 for each of the various tenants subscribing to the multi-tenant system 800. In accordance with one non-limiting example, the multi-tenant system 800 is implemented in the form of an on-demand multi-tenant customer relationship management (CRM) system that can support any number of authenticated users of multiple tenants.

As used herein, a "tenant" or an "organization" should be understood as referring to a group of one or more users that shares access to common subset of the data within the multi-tenant database 830. In this regard, each tenant includes one or more users associated with, assigned to, or otherwise belonging to that respective tenant. To put it another way, each respective user within the multi-tenant system 800 is associated with, assigned to, or otherwise belongs to a particular tenant of the plurality of tenants supported by the multi-tenant system 800. Tenants may represent customers, customer departments, business or legal organizations, and/or any other entities that maintain data for particular sets of users within the multi-tenant system 800 (i.e., in the multi-tenant database 830). For example, the application server 802 may be associated with one or more tenants supported by the multi-tenant system 800. Although multiple tenants may share access to the server 802 and the database 830, the particular data and services provided from the server 802 to each tenant can be securely isolated from those provided to other tenants (e.g., by restricting other tenants from accessing a particular tenant's data using that tenant's unique organization identifier as a filtering criterion). The multi-tenant architecture therefore allows different sets of users to share functionality and hardware resources without necessarily sharing any of the data 832 belonging to or otherwise associated with other tenants.

The multi-tenant database 830 is any sort of repository or other data storage system capable of storing and managing the data 832 associated with any number of tenants. The database 830 may be implemented using any type of conventional database server hardware. In various embodiments, the database 830 shares processing hardware 804 with the server 802. In other embodiments, the database 830 is implemented using separate physical and/or virtual database server hardware that communicates with the server 802 to perform the various functions described herein. In an exemplary embodiment, the database 830 includes a database management system or other equivalent software capable of determining an optimal query plan for retrieving and providing a particular subset of the data 832 to an instance of virtual application 828 in response to a query initiated or otherwise provided by a virtual application 828. The multi-tenant database 830 may alternatively be referred to herein as an on-demand database, in that the multi-tenant database 830 provides (or is available to provide) data at run-time to on-demand virtual applications 828 generated by the application platform 810.

In practice, the data 832 may be organized and formatted in any manner to support the application platform 810. In various embodiments, the data 832 is suitably organized into a relatively small number of large data tables to maintain a semi-amorphous "heap"-type format. The data 832 can then be organized as needed for a particular virtual application 828. In various embodiments, conventional data relationships are established using any number of pivot tables 834 that establish indexing, uniqueness, relationships between entities, and/or other aspects of conventional database organization as desired. Further data manipulation and report formatting is generally performed at run-time using a variety of metadata constructs. Metadata within a universal data directory (UDD) 836, for example, can be used to describe any number of forms, reports, workflows, user access privileges, business logic and other constructs that are common to multiple tenants. Tenant-specific formatting, functions and other constructs may be maintained as tenant-specific metadata 838 for each tenant, as desired. Rather than forcing the data 832 into an inflexible global structure that is common to all tenants and applications, the database 830 is organized to be relatively amorphous, with the pivot tables 834 and the metadata 838 providing additional structure on an as-needed basis. To that end, the application platform 810 suitably uses the pivot tables 834 and/or the metadata 838 to generate "virtual" components of the virtual applications 828 to logically obtain, process, and present the relatively amorphous data 832 from the database 830.

The server 802 is implemented using one or more actual and/or virtual computing systems that collectively provide the dynamic application platform 810 for generating the virtual applications 828. For example, the server 802 may be implemented using a cluster of actual and/or virtual servers operating in conjunction with each other, typically in association with conventional network communications, cluster management, load balancing and other features as appropriate. The server 802 operates with any sort of conventional processing hardware 804, such as a processor 805, memory 806, input/output features 808 and the like. The input/output features 808 generally represent the interface(s) to networks (e.g., to the network 845, or any other local area, wide area or other network), mass storage, display devices, data entry devices and/or the like. The processor 805 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 806 represents any non-transitory short or long term storage or other computer-readable media capable of storing programming instructions for execution on the processor 805, including any sort of random access memory (RAM), read only memory (ROM), flash memory, magnetic or optical mass storage, and/or the like. The computer-executable programming instructions, when read and executed by the server 802 and/or processor 805, cause the server 802 and/or processor 805 to create, generate, or otherwise facilitate the application platform 810 and/or virtual applications 828 and perform one or more additional tasks, operations, functions, and/or processes described herein. It should be noted that the memory 806 represents one suitable implementation of such computer-readable media, and alternatively or additionally, the server 802 could receive and cooperate with external computer-readable media that is realized as a portable or mobile component or application platform, e.g., a portable hard drive, a USB flash drive, an optical disc, or the like.

The application platform 810 is any sort of software application or other data processing engine that generates the virtual applications 828 that provide data and/or services to the client devices 840. In a typical embodiment, the application platform 810 gains access to processing resources, communications interfaces and other features of the processing hardware 804 using any sort of conventional or proprietary operating system 809. The virtual applications 828 are typically generated at run-time in response to input received from the client devices 840. For the illustrated embodiment, the application platform 810 includes a bulk data processing engine 812, a query generator 814, a search engine 816 that provides text indexing and other search functionality, and a runtime application generator 820. Each of these features may be implemented as a separate process or other module, and many equivalent embodiments could include different and/or additional features, components or other modules as desired.

The runtime application generator 820 dynamically builds and executes the virtual applications 828 in response to specific requests received from the client devices 840. The virtual applications 828 are typically constructed in accordance with the tenant-specific metadata 838, which describes the particular tables, reports, interfaces and/or other features of the particular application 828. In various embodiments, each virtual application 828 generates dynamic web content that can be served to a browser or other client program 842 associated with its client device 840, as appropriate.

The runtime application generator 820 suitably interacts with the query generator 814 to efficiently obtain multi-tenant data 832 from the database 830 as needed in response to input queries initiated or otherwise provided by users of the client devices 840. In a typical embodiment, the query generator 814 considers the identity of the user requesting a particular function (along with the user's associated tenant), and then builds and executes queries to the database 830 using system-wide metadata 836, tenant specific metadata 838, pivot tables 834, and/or any other available resources. The query generator 814 in this example therefore maintains security of the common database 830 by ensuring that queries are consistent with access privileges granted to the user and/or tenant that initiated the request. In this manner, the query generator 814 suitably obtains requested subsets of data 832 accessible to a user and/or tenant from the database 830 as needed to populate the tables, reports or other features of the particular virtual application 828 for that user and/or tenant.

Still referring to FIG. 8, the data processing engine 812 performs bulk processing operations on the data 832 such as uploads or downloads, updates, online transaction processing, and/or the like. In many embodiments, less urgent bulk processing of the data 832 can be scheduled to occur as processing resources become available, thereby giving priority to more urgent data processing by the query generator 814, the search engine 816, the virtual applications 828, etc.

In exemplary embodiments, the application platform 810 is utilized to create and/or generate data-driven virtual applications 828 for the tenants that they support. Such virtual applications 828 may make use of interface features such as custom (or tenant-specific) screens 824, standard (or universal) screens 822 or the like. Any number of custom and/or standard objects 826 may also be available for integration into tenant-developed virtual applications 828. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. For example, a virtual CRM application may utilize standard objects 826 such as "account" objects, "opportunity" objects, "contact" objects, or the like. The data 832 associated with each virtual application 828 is provided to the database 830, as appropriate, and stored until it is requested or is otherwise needed, along with the metadata 838 that describes the particular features (e.g., reports, tables, functions, objects, fields, formulas, code, etc.) of that particular virtual application 828. For example, a virtual application 828 may include a number of objects 826 accessible to a tenant, wherein for each object 826 accessible to the tenant, information pertaining to its object type along with values for various fields associated with that respective object type are maintained as metadata 838 in the database 830. In this regard, the object type defines the structure (e.g., the formatting, functions and other constructs) of each respective object 826 and the various fields associated therewith.

Still referring to FIG. 8, the data and services provided by the server 802 can be retrieved using any sort of personal computer, mobile telephone, tablet or other network-enabled client device 840 on the network 845. In an exemplary embodiment, the client device 840 includes a display device, such as a monitor, screen, or another conventional electronic display capable of graphically presenting data and/or information retrieved from the multi-tenant database 830. Typically, the user operates a conventional browser application or other client program 842 executed by the client device 840 to contact the server 802 via the network 845 using a networking protocol, such as the hypertext transport protocol (HTTP) or the like. The user typically authenticates his or her identity to the server 802 to obtain a session identifier ("SessionID") that identifies the user in subsequent communications with the server 802. When the identified user requests access to a virtual application 828, the runtime application generator 820 suitably creates the application at run time based upon the metadata 838, as appropriate. As noted above, the virtual application 828 may contain Java, ActiveX, or other content that can be presented using conventional client software running on the client device 840; other embodiments may simply provide dynamic web or other content that can be presented and viewed by the user, as desired.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to on-demand applications, console systems, user interfaces, web browsers, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another. In one or more exemplary embodiments, the subject matter described herein is implemented in conjunction with a virtual customer relationship management (CRM) application in a multi-tenant environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A method for aggregating and presenting task data, comprising:
   retrieving, from a task database, a plurality of task objects, each including at least a task description, a task date, and a priority level;
   aggregating a subset of the task objects to obtain aggregated task data; and
   displaying, on a computing device, a visual representation of the aggregated task data, the visual representation including a temporal distribution of the subset of task objects and, for each task date of the subset of the task objects, a visual cue indicating an intensity level of the task objects associated with each task date, wherein the intensity level is computed based on a number of the task objects associated with each task date and respective priority levels of the task objects associated with each task date.

2. The method of claim 1, wherein the visual cues include a plurality of colors associated with respective intensity levels, and further comprising:
   assigning a weighting factor to each priority level;
   summing the weighting factors for each of the task objects associated with each task date to generate an intensity sum for each task date; and
   associating each intensity sum with a color indicating the intensity level of the task objects associated with each task date, and
   wherein each visual cue indicates the intensity level of the task objects associated with each task date via the color associated with the intensity sum for that task date.

3. The method of claim 2, wherein the visual cues are date numerals that are each used to indicate a date, wherein each date numeral has the color associated with the intensity sum for that task date.

4. The method of claim 1, wherein the visual representation comprises:
   a calendar graphic including the range of the task dates for the subset of task objects and the visual cues for each of the task dates of the subset of task objects.

5. The method of claim 4, wherein the calendar graphic selectively displays either a week or a month of task dates.

6. The method of claim 1, wherein the visual cues are a plurality of circular regions whose radii are proportional to their respective intensities.

7. The method of claim 1, wherein the visual cues include a plurality of geometric shapes associated with respective intensity levels.

8. The method of claim 7, wherein the magnitude of each of the geometric shapes is proportional to their respective intensity levels.

9. The method of claim 1, further including displaying, in conjunction with the visual representation, a date-picker user interface configured to allow a user to specify a first task description and a first task date to be transmitted to the task database.

10. The method of claim 1, wherein the visual cues are date numerals that are each used to indicate a date, wherein a size of each date numeral indicates the intensity level of the task objects associated with a task date.

11. A non-transitory machine-readable medium including instructions for processing task data, which instructions, when executed by a processor, causes the processor to perform the steps of:
    retrieving, from a task database, a plurality of task objects, each including at least a task description, a task date, and a priority level;
    aggregating a subset of the task objects to obtain aggregated task data; and
    displaying, on a computing device, a visual representation of the aggregated task data, the visual representation including a temporal distribution of the subset of task objects and, for each task date of the subset of the task objects, a visual cue indicating an intensity level of the task objects associated with each task date, wherein the intensity level is computed based on a number of the task objects associated with each task date and respective priority levels of the task objects associated with each task date.

12. The non-transitory machine-readable medium of claim 11, wherein the visual cues include a plurality of colors associated with respective intensity levels, and wherein instructions, when executed by a processor, cause the processor to perform the steps of:
assigning a weighting factor to each priority level;
summing the weighting factors for each of the task objects associated with each task date to generate an intensity sum for each task date; and
associating each intensity sum with a color indicating the intensity level of the task objects associated with each task date, and
wherein each visual cue indicates the intensity level of the task objects associated with each task date via the color associated with the intensity sum for that task date.

13. The non-transitory machine-readable medium of claim 11, wherein the visual representation comprises:
a calendar graphic including the range of the task dates for the subset of task objects and the visual cues for each of the task dates of the subset of task objects.

14. The non-transitory machine-readable medium of claim 13, wherein the calendar graphic selectively displays either a week or a month of task dates.

15. The non-transitory machine-readable medium of claim 11, wherein the visual cues are a plurality of circular regions whose radii are proportional to their respective intensities.

16. The non-transitory machine-readable medium of claim 11, wherein the visual cues are date numerals that are each used to indicate a date, wherein each date numeral has the color associated with the intensity sum for that task date.

17. The non-transitory machine-readable medium of claim 11, further including displaying, in conjunction with the visual representation, a date-picker user interface configured to allow a user to specify a first task description and a first task date to be transmitted to the task database.

18. A task aggregation and presentation system comprising:
a task database comprising a plurality of task objects, each including a task description, a task date, and a priority level, the database configured to produce aggregated task data based on a subset of the plurality of task objects;
a computing device configured to request, over a network, the aggregated task data from the task database and to display a visual representation of the aggregated task data, the visual representation including a temporal distribution of the subset of task objects and, for each task date of the subset of the task objects, a visual cue indicating an intensity level of the task objects associated with each task date, wherein the intensity level is computed based on a number of the task objects associated with each task date and respective priority levels of the task objects associated with each task date.

19. The task aggregation system of claim 18, wherein the visual cues include a plurality of colors associated with respective intensity levels, and wherein the task database is further configured to: assign a weighting factor to each priority level, sum the weighting factors for each of the task objects associated with each task date to generate an intensity sum for each task date; and associate each intensity sum with a color indicating the intensity level of the task objects associated with each task date, and
wherein each visual cue indicates the intensity level of the task objects associated with each task date via the color associated with the intensity sum for that task date.

20. The task aggregation system of claim 18, wherein the visual representation comprises:
a calendar graphic including the range of the task dates for the subset of task objects and the visual cues for each of the task dates of the subset of task objects.

21. The task aggregation system of claim 18, wherein the visual cues are a plurality of circular regions whose radii are proportional to their respective intensities.

22. The task aggregation system of claim 18, wherein the visual cues are date numerals that are each used to indicate a date, wherein each date numeral has the color associated with the intensity sum for that task date.

* * * * *